United States Patent
Mayo et al.

(10) Patent No.: US 11,803,518 B2
(45) Date of Patent: Oct. 31, 2023

(54) JOURNALS TO RECORD METADATA CHANGES IN A STORAGE SYSTEM

(71) Applicants: Richard Phillip Mayo, Bristol (GB); David Malcolm Falkinder, Bristol (GB); Russell Ian Monk, Bristol (GB); Peter Thomas Camble, Bristol (GB)

(72) Inventors: Richard Phillip Mayo, Bristol (GB); David Malcolm Falkinder, Bristol (GB); Russell Ian Monk, Bristol (GB); Peter Thomas Camble, Bristol (GB)

(73) Assignee: Hewlett Packard Enterprise Development LP, Spring, TX (US)

(*) Notice: Subject to any disclaimer, the term of this patent is extended or adjusted under 35 U.S.C. 154(b) by 52 days.

(21) Appl. No.: 17/060,466

(22) Filed: Oct. 1, 2020

(65) Prior Publication Data
US 2022/0107921 A1   Apr. 7, 2022

(51) Int. Cl.
*G06F 7/00* (2006.01)
*G06F 16/18* (2019.01)
*G06F 16/16* (2019.01)
*G06F 16/17* (2019.01)
*G06F 16/174* (2019.01)

(52) U.S. Cl.
CPC ........ *G06F 16/1815* (2019.01); *G06F 16/164* (2019.01); *G06F 16/1734* (2019.01); *G06F 16/1748* (2019.01); *G06F 16/1873* (2019.01)

(58) Field of Classification Search
CPC ............... G06F 16/164; G06F 16/1873; G06F 16/1748; G06F 16/1734; G06F 16/1815

USPC ........ 707/822, 825, 826, 625, 684, 693, 821
See application file for complete search history.

(56) References Cited

U.S. PATENT DOCUMENTS

| | | | |
|---|---|---|---|
| 7,644,107 B2 | 1/2010 | Neagovici-negoescu et al. | |
| 8,131,691 B1 | 3/2012 | Nagaralu et al. | |
| 8,566,519 B2 | 10/2013 | Lay et al. | |
| 8,799,238 B2 | 8/2014 | Eshghi et al. | |
| 8,949,247 B2 | 2/2015 | Torbjørnsen | |
| 10,365,974 B2 | 7/2019 | Todd et al. | |
| 11,182,256 B2 | 11/2021 | Mayo et al. | |
| 2005/0165865 A1* | 7/2005 | Farmer | G06F 11/1471 |
| 2008/0294605 A1 | 11/2008 | Prahlad et al. | |
| 2009/0307290 A1* | 12/2009 | Barsness | G06F 16/27 |

(Continued)

OTHER PUBLICATIONS

Mao, B. et al.; "Read-Performance Optimization for Deduplication-Based Storage Systems in the Cloud"; Mar. 2014; 22 pages.

(Continued)

*Primary Examiner* — Md I Uddin
(74) *Attorney, Agent, or Firm* — Trop, Pruner & Hu, P.C.

(57) ABSTRACT

Examples implementations relate to journals for metadata changes. An example includes detecting, by a storage controller, metadata changes associated with a container index of a deduplication storage system; recording, by the storage controller, the detected metadata changes in a journal associated with the container index, where the journal is included in a journal group comprising a plurality of journals; determining, by the storage controller, whether a filled amount of the journal exceeds a fill threshold; and, in response to a determination that the filled amount of the journal does not exceed the fill threshold, writing the journal group from memory to persistent storage.

17 Claims, 12 Drawing Sheets

(56) References Cited

U.S. PATENT DOCUMENTS

2018/0232286 A1* 8/2018 Satoyama ........... G06F 11/2064
2019/0340157 A1* 11/2019 Earl ................... G06F 16/1734

OTHER PUBLICATIONS

Prabhakaran et al., "Analysis and Evolution of Journaling File Systems," 2005, USENIX Annual Technical Conference, General Track, vol. 194, pp. 196-215.
Rosenblum et al., "The Design and Implementation of a Log-Structured File System," 1992, ACM Transactions on Computer Systems, vol. 10, No. 1, pp. 26-52.
Arpaci-Dusseau et al., "Scheduling: Introduction," Operating Systems: Three Easy Pieces, Chapter 7, available online at <https://web.archive.org/web/20200310015223/https://pages.cs.wisc.edu/~remzi/OSTEP/cpu-sched.pdf>. Mar. 10, 2020, 13 pages.
Avrim Blum, "Amortized Analysis," Lecture 7, available online at <https://web.archive.org/web/20200201002508/https://www.cs.cmu.edu/~avrim/451f11/lectures/lect0922.pdf>, Feb. 1, 2020, 6 pages.
Radu Gheorghe, "Tutorial: Logging with journald", available online at <<https://sematext.com/blog/journald-logging-tutorial/>, Apr. 28, 2020, 21 pages.

* cited by examiner

JOURNALS TO RECORD METADATA CHANGES IN A STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
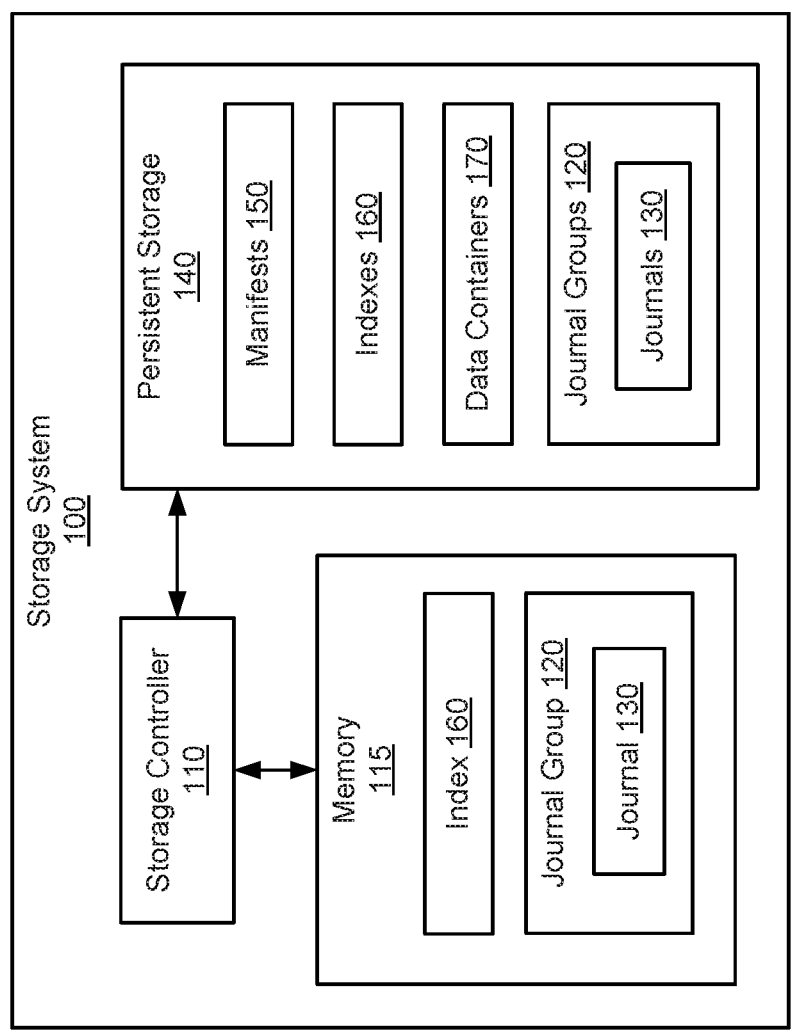
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use stored metadata for processing and reconstructing the original data stream from the stored data units. In this manner, the deduplication process may avoid storing duplicate copies of repeated data units, and thereby may reduce the amount of space required to store the stream of data. In some examples, the deduplication metadata may include data recipes (also referred to herein as "manifests") that specify the order in which particular data units were received (e.g., in a data stream). In response to a read request, the deduplication system may use a manifest to determine the received order of data units, and thereby recreate the original data stream. The manifest may include a sequence of records, with each record representing a particular set of data unit(s). The records of the manifest may include one or more fields (also referred to herein as "pointer information") that identify indexes that include storage information for the data units. For example, the storage information may include one or more index fields that specify location information (e.g., containers, offsets, etc.) for the stored data units, compression and/or encryption characteristics of the stored data units, and so forth. In some examples, the manifests and indexes may each be read in addressable portions of fixed sizes (e.g., 4 KB portions).

In some examples, an index storing metadata may be loaded into memory as a whole unit. For example, a container index may be loaded into memory to provide storage information for one or more data units. Further, some operations may cause the metadata in the index to be changed (e.g., when the number of data units associated with the index is increased or decreased). Furthermore, after the index is changed, the index may be written to a persistent storage (e.g., during a memory flush). In some examples, the entire index may be written to persistent storage as a whole unit in order to preserve encryption and/or compression of the index, to maintain compatibility with a storage system, and so forth. However, in some examples, the metadata changes may have only affected a relatively small portion of the index (e.g., one record out of ten thousand records in the index) while the index was loaded in memory. Therefore, in such examples, writing the entire index to persistent storage will consume much more system processing time and bandwidth than would be required if only the changed portion was being written to persistent storage.

In accordance with some implementations of the present disclosure, a deduplication storage system may use journals associated with indexes. When events occur that would result in changes to the metadata stored in an index, those changes may be recorded in a journal associated with the index. In some implementations, when a requirement exists to write an index to persistent storage, a determination may be made as to whether a filled level of the associated journal exceeds a predefined threshold. If the filled level does not exceed the threshold, the journal is written to persistent storage instead of the index. Further, because the journal only records the changes to the index, writing the journal to persistent storage will consume relatively less processing time and bandwidth than would be required if the entire index was being written to persistent storage. In this manner, using journals may improve the performance of the deduplication storage system.

In some implementations, a journal group may be formed from multiple journals, where these journals are associated with indexes storing metadata associated with a single object stored in the deduplication system (e.g., a file, a table, and so forth). As such, the journal group may only include journals associated with a single stored object. Further, in some implementations, the entire journal group may be written to disk as a whole. In some examples, any metadata changes to the data units of a single stored object may be more likely to occur in temporal proximity to each other (e.g., in consecutive order, within a short time interval, and so forth). Accordingly, writing an entire journal group to persistent storage may be more likely to include journals that have been updated concurrently, and may thereby reduce the total number of write operations into persistent storage. In this manner, use of journal groups may also improve the performance of the deduplication storage system.

1. Example Storage System

FIG. 1 shows an example of a storage system 100 that includes a storage controller 110, memory 115, and persistent storage 140, in accordance with some implementations. As shown, the persistent storage 140 may include any number of manifests 150, indexes 160, and data containers 170. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM).

In some implementations, the storage system 100 may perform deduplication of stored data. For example, the storage controller 110 may divide a stream of input data into data units, and may store at least one copy of each data unit in a data container 170 (e.g., by appending the data units to the end of the container 170). In some examples, each data container 170 may be divided into portions (also referred to herein as "entities").

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

As shown in FIG. 1, the persistent storage 140 may store manifests 150, indexes 160, data containers 170, and journal groups 120. In some implementations, the storage controller 110 may generate a manifest 150 to record the order in which the data units were received. Further, the manifest 150 may include a pointer or other information indicating the index 160 that is associated with each data unit. In some implementations, the associated index 160 may indicate the location in which the data unit is stored. For example, the associated index 160 may include information specifying that the data unit is stored at a particular offset in an entity, and that the entity is stored at a particular offset in a data container 170.

In some implementations, the storage controller 110 may receive a read request to access the stored data, and in response may access the manifest 150 to determine the sequence of data units that made up the original data. The storage controller 110 may then use pointer data included in the manifest 150 to identify the indexes 160 associated with the data units. Further, the storage controller 110 may use information included in the identified indexes 160 to determine the locations that store the data units (e.g., data container 170, entity, offsets, etc.), and may then read the data units from the determined locations.

In some implementations, a journal 130 may be associated with each index 160. The journal 130 may record changes associated with the metadata stored in the index 160. For example, when a copy of the index 160 present in memory 115 is modified to reflect a change to the metadata, that change may also be recorded as an entry in the associated journal 130. In some implementations, multiple journals 130 may be grouped in a journal group 120 associated with a single file or object stored in the deduplication system. For example, the multiple journals may correspond to indexes storing metadata associated with a single file.

In some implementations, the storage system 100 may store an index 160 in the memory 115 while accessing data unit(s) associated with that index 160. For example, the index 160 may be stored in memory 115 while data units associated with index 160 are added to a data container 170, are deleted from the data container 170, and so forth. Further, the memory 115 may also store a journal group 120 that includes a journal 130 corresponding to the index 160. In some implementations, the journal 130 may record a set of changes associated with the metadata stored in the index 160. For example, when modifying the index 160 in memory 115 to reflect a change to the metadata, that change may also be recorded in the journal 130.

In some implementations, in response to a command or an event, the index 160 may be modified to include the changes recorded in the journal 130. For example, upon loading an index 160 and associated journal 130 into memory 115 (e.g., in response to a read request), the version number of the index 160 and the journal 130 may be compared. If the version number of the journal 130 is higher (i.e., newer) than the version number of the index 160, the changes recorded in the index 160 may be accessed in chronological order (e.g., in order of occurrence), and each change may be sequentially performed in the index 160. Otherwise, if the version number of the journal 130 is not higher than the version number of the index 160, the journal 130 may be cleared of all recorded changes, and the journal 130 may be made available for recording additional changes. The journals 130 and the journal groups 120 are described further below with reference to FIGS. 2-10.

2. Example Data Structures

Figure 2:
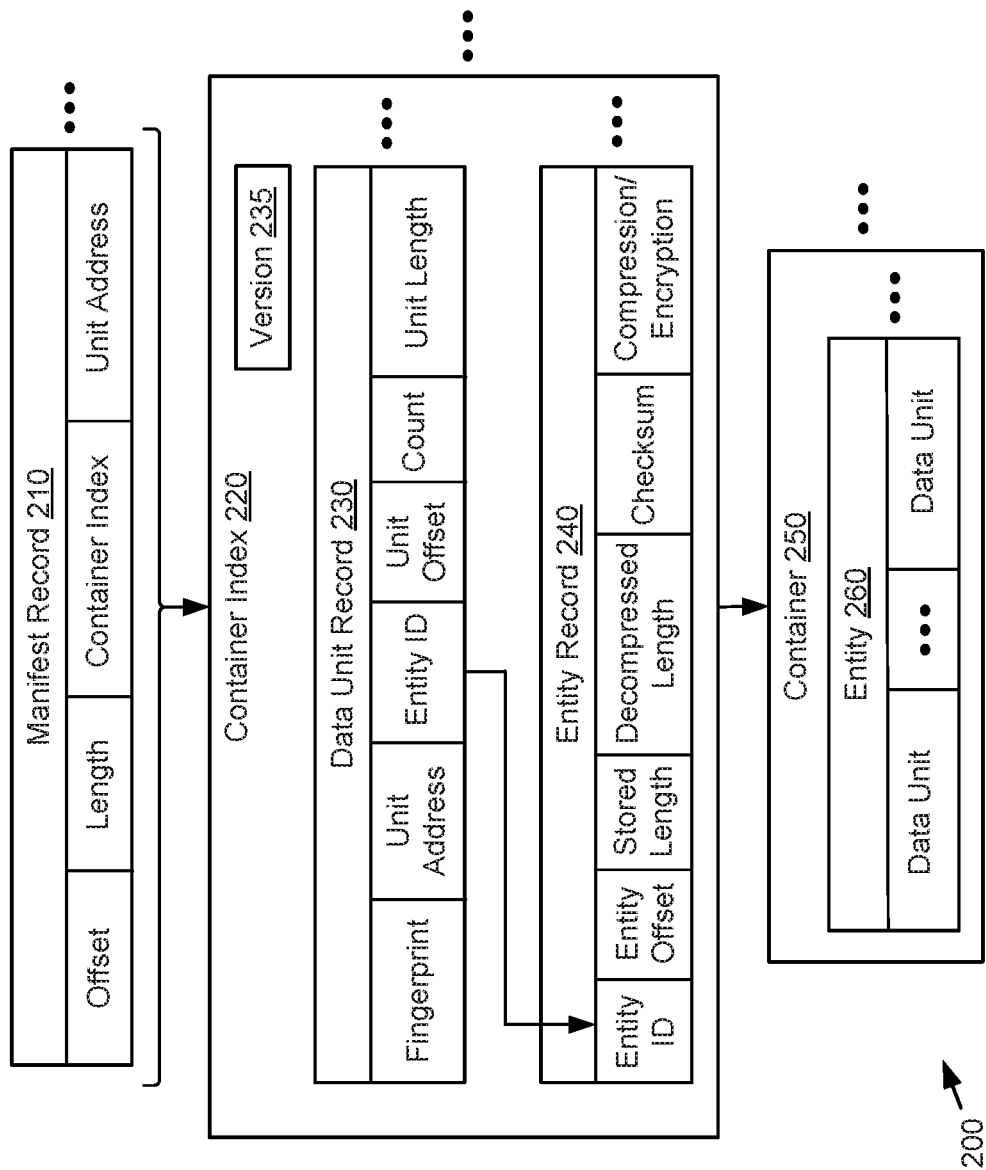
FIG. 2 is an illustration of example data structures, in accordance with some implementations.

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the container index 220 and the container 250 may correspond generally to example implementations of the index 160 and the data container 170 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various metadata fields, such as a fingerprint (e.g., a hash of the data unit), a unit address, an entity identifier, a unit offset (i.e., an offset of the data unit within the entity), a count value, and a unit length. Further, each entity record 240 may include various metadata fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, each container index 220 may include a version number 235. The version number 235 may indicate a generation or relative age of the metadata in the container index. For example, the version number 235 may be compared to a version number of an associated journal (not shown in FIG. 2). If the version number 235 is greater than the version number of the associated journal, it may be determined that the container index 220 includes newer metadata than the associated journal.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identity the container 250 and entity 260, and the data unit may then be read from the identified container 250 and entity 260.

3. Example Data Structures

Figure 3:
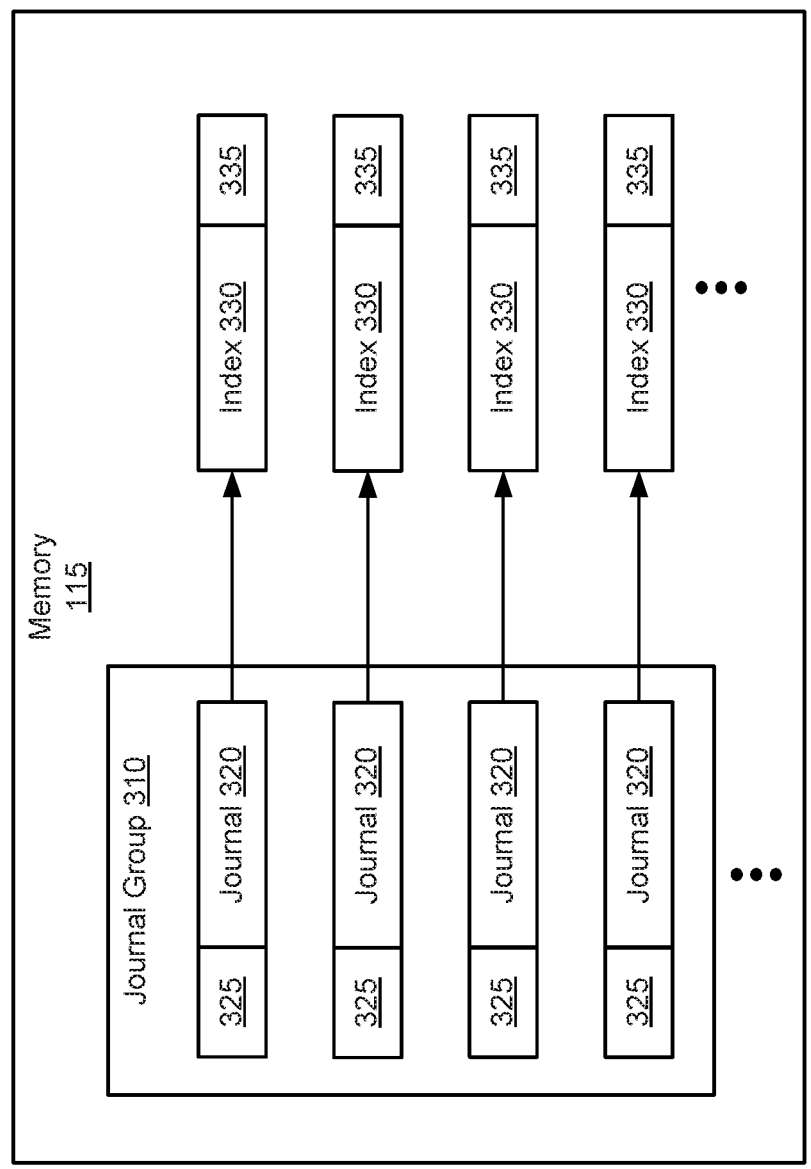
FIG. 3 is an illustration of example data structures, in accordance with some implementations.

Referring now to FIG. 3, shown is an illustration of the memory 115 including a journal group 310 and multiple indexes 330. As shown, the journal group 310 includes multiple journals 320. In some examples, the journal group 310, journals 320, and indexes 330 may correspond generally to example implementations of the journal group 120, journals 130, and indexes 160 (shown in FIG. 1), respectively.

In some implementations, each journal 320 may be associated with a corresponding index 330, and may record changes to the metadata stored in the corresponding index 330. Further, for each journal group 120, all of the corresponding indexes 330 may be associated with a single stored object (e.g., a document, a database table, a data file, and so forth). For example, all of the corresponding indexes 330 may include metadata for data units included in a single file stored in a deduplication system (e.g., storage system 100 shown in FIG. 1).

In some implementations, each journal 320 may include or be associated with a version number 325. Further, each index 330 may include or be associated with a version number 335. In some implementations, the version number 325 may be compared to the version number 335 to determine whether the journal 320 or the associated index 330 reflects the latest version of metadata. For example, if the version number 325 is greater than the version number 335, it may be determined that the change data included in the journal 320 reflects a state of metadata that is more recent than the metadata stored in the index 330. If so, the index 330 may be updated to include the changes recorded in the journal 320. However, if the version number 325 is smaller than the version number 335, it may be determined that the change data included in the journal 320 reflects a state of metadata that is older than the metadata stored in the index 330. In this situation, the journal 320 may be cleared without updating the index 330. In some implementations, the comparison of the version number 325 to the version number 335 may be performed in response to loading the journal 320 or the associated index 330 from persistent storage into memory (e.g., from persistent storage 140 into memory 115, as shown in FIG. 1).

In one or more implementations, the number of journals 320 included in a journal group 310 may be specified in a stored parameter (e.g., a user setting, a configuration variable, and so forth). In some examples, this parameter may be adjusted or tuned to modify the performance characteristics of input/output (110) operations in a storage system. For example, this parameter may be increased to attempt to obtain relatively less frequent write operations of relatively larger size. In another example, this parameter may be decreased to attempt to obtain relatively more frequent write operations of relatively smaller size.

4. Example Processes

Figure 4A:
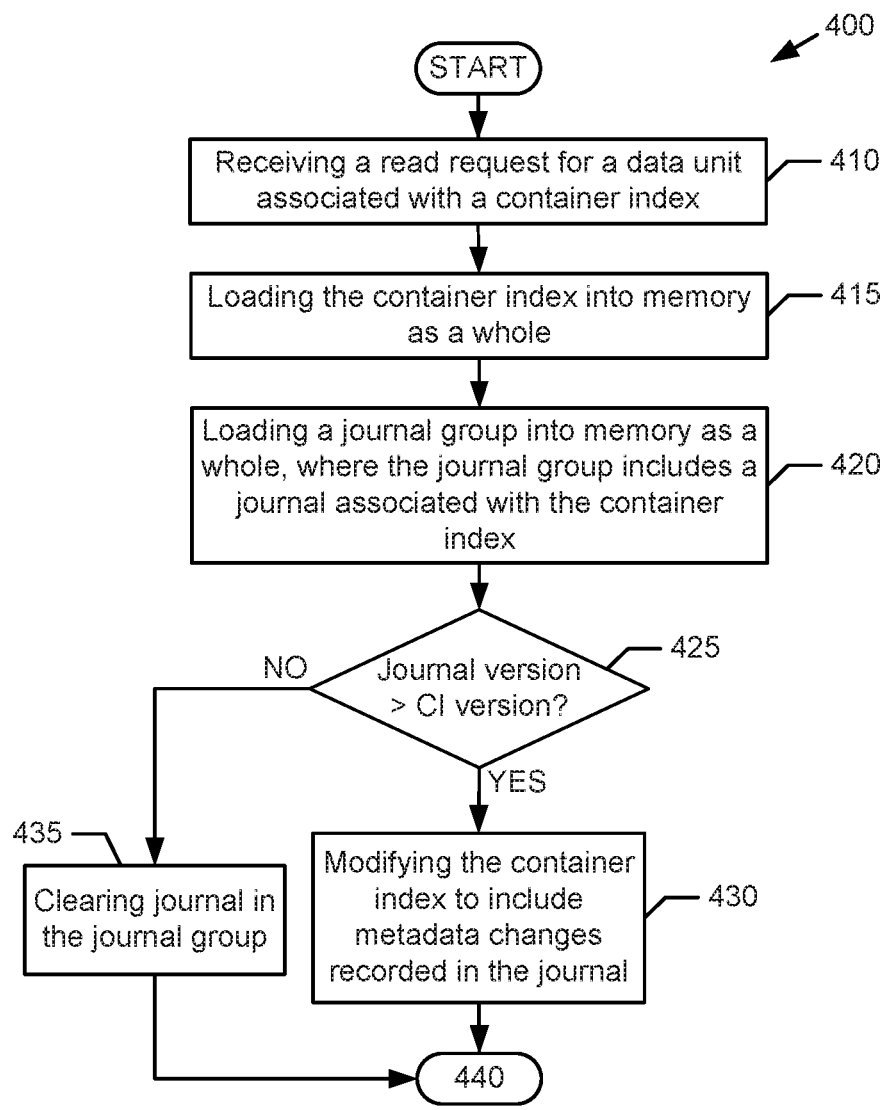
FIGS. 4A-4C are illustrations of example processes, in accordance with some implementations.
Figure 4B:
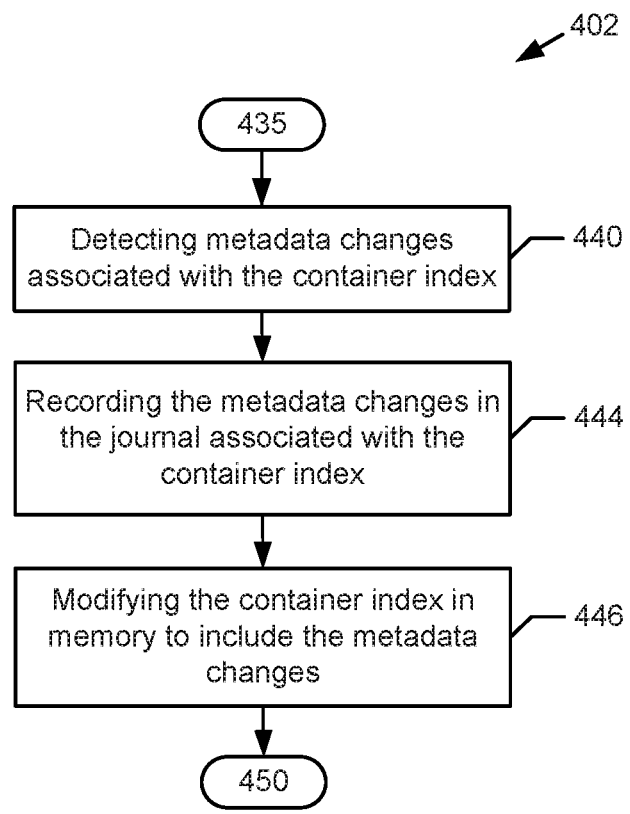
Figure 4C:
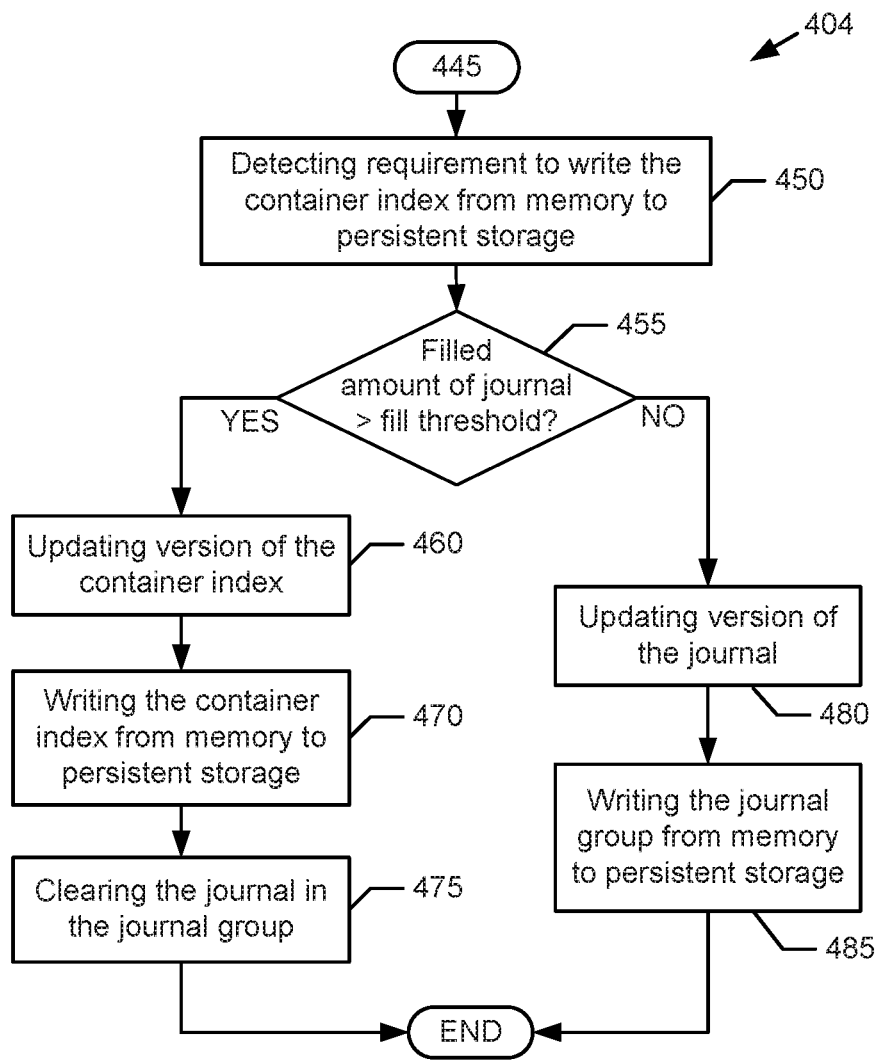

Referring now to FIGS. 4A-4C, shown are example processes 400-404, in accordance with some implementations. In some examples, the processes 400-404 may be performed using the storage controller 110 (shown in FIG. 1). The processes 400-404 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the processes 400-404 may be described below with reference to FIGS. 1-3, which show examples in accordance with some implementations. However, other implementations are also possible.

Referring now to FIG. 4A, the process 400 may be performed to load a container index and a journal group into memory, in accordance with some implementations. Block 410 may include receiving a read request for a data unit associated with a container index. Block 415 may include loading the container index into memory as a whole. For example, referring to FIGS. 1-2, the storage controller 110 may receive a read request that specifies an offset and length. The offset and length may identify or be associated with a data unit or portion included in a stored data file. The storage controller 110 may use the offset and length to identify a manifest record 210. Further, the storage controller 110 may identify a container index 220 that matches the pointer information of the manifest record 210, and may load the identified container index 220 from the persistent storage 140 into the memory 115 as a whole unit.

Block 420 may include loading a journal group into memory as a whole, where the journal group includes a journal associated with the container index. For example, referring to FIGS. 1-3, the storage controller 110 may identify a journal 320 that is associated with an index 330 (e.g., the container index loaded into memory at block 415), and may determine that the identified journal 320 is included in a journal group 310. Further, the storage controller 110 may load the journal group 310 from the persistent storage 140 into the memory 115 as a whole unit.

Decision block 425 may include determining whether a version of the journal is greater than a version of the container index. If it is determined that the version of the journal is greater (i.e., newer) than the version of the container index ("Yes" at block 425), then the process 400 may continue at block 430, which may include modifying the container index to include metadata changes recorded in the journal. However, if it is determined at block 425 that the version of the journal is not greater than the version of the container index ("No" at block 425), then the process 400 may continue at block 435, which may include clearing the journal in the journal group. For example, referring to FIGS. 1-3, in response to loading the journal 320 or the associated index 330 from persistent storage 140 into memory 115 (e.g., as included in blocks 415 and 420), the storage controller 110 may compare the version number 325 of the journal 320 to the version number 335 of the index 330. If the version number 325 is greater than the version number 335, the index 330 may be updated to include the metadata changes recorded in the journal 320. Otherwise, if the version number 325 is not greater than the version number 335, the journal 320 may be cleared (i.e., all recorded changes may be deleted in the journal 320). After block 435, the process 400 may be completed. In some examples, upon completing the process 400, a storage system may continue to perform a process 402 (described below with reference to FIG. 4B).

Referring now to FIG. 4B, the process 402 may be performed to record metadata changes in a journal. In some implementations, the process 402 may be performed after completing the process 400 shown in FIG. 4A (i.e., to load a container index and a journal group into memory).

As shown in FIG. 4B, block 440 may include detecting metadata changes associated with the container index. Block 444 may include recording the detected metadata changes in the journal associated with the container index. Block 446 may include modifying the container index to include the detected metadata changes. For example, referring to FIGS. 1-3, the storage controller 110 may detect changes to the metadata stored in the index 330. For example, such changes may include an increase to a reference count stored in the index 330 (e.g., in the count field(s) in the data unit record 230 and/or the entity record 240, as shown in FIG. 2).

Further, the storage controller 110 may record the detected metadata changes in the corresponding journal 320, and may also modify the index 330 to include the detected metadata changes. After block 446, the process 402 may be completed. In some examples, upon completing the process 402, a storage system may continue to perform a process 404 (described below with reference to FIG. 4C).

Referring now to FIG. 4C, the process 404 may be performed to write a container index or a journal to persistent storage. In some implementations, the process 404 may be performed subsequently to performing the process 402 shown in FIG. 4B (i.e., to record metadata changes in the journal).

As shown in FIG. 4C, block 450 may include detecting a requirement to write the container index to persistent storage. Decision block 455 may include determining whether the filled amount of the journal is greater than a fill threshold. For example, referring to FIGS. 1-3, the storage controller 110 may detect an event that would normally require or cause one or more indexes 330 to be written from memory 115 to persistent storage 140 (e.g., a user or application command to flush memory, an eviction due to a full memory allocation, and so forth). The storage controller 110 may then identify an index 330 that is affected by this requirement, and may also identify the journal 320 that is associated with the identified index 330. Further, the storage controller 110 may determine whether the filled amount of the journal 320 exceeds a fill threshold (e.g., 10%). As used herein, the "filled amount" of the journal refers to the level or proportion of the journal 320 that is occupied by data that records metadata changes. Further, as used herein, "fill threshold" refers to a filled level of the journal that determines whether the container index or the journal is written to persistent storage. In some implementations, the journal 320 may be one of multiple journals 320 included in a journal group 310.

If it is determined at block 455 that the filled amount of the journal is greater than the fill threshold ("Yes" at block 455), then the process 404 may continue at blocks 460-475. Block 460 may include updating the version number of the container index. Block 470 may include writing the container index to persistent storage. Block 475 may include clearing the journal in the journal group. For example, referring to FIGS. 1-3, the storage controller 110 may determine the larger number between the current version number 325 of the journal 320 and the current version number 335 of the index 330, and then increment the determined larger number by one (i.e., add one) to generate a new version number 335 of the index 330. The storage controller 110 may write the index 330 (including the new version number 335) from memory 115 to the persistent storage 140, and then clear the journal 320 to remove the recorded metadata changes.

However, if it is determined at block 455 that the filled amount of the journal is not greater than the fill threshold ("No" at block 455), then the process 404 may continue at blocks 480-485. Block 480 may include updating the version number of the journal. Block 485 may include writing the journal group from memory to persistent storage. For example, referring to FIGS. 1-3, the storage controller 110 may determine the larger number of the current version number 325 of the journal 320 and the current version number 335 of the index 330, and then increment the larger number by one (i.e., add one) to generate a new version number 325 of the index 330. The storage controller 110 may then identify a journal group 310 that includes the modified journal 320, and may write the identified journal group 310 as a whole from memory 115 to the persistent storage 140. After either block 475 or block 485, the process 404 may be completed.

In one or more implementations, the fill threshold used for a journal 320 may be based on the size of the associated index 330. For example, in some implementations, the fill threshold may be specified as a percentage or proportion (e.g., 10%) of the seeded size of the index 330. As used herein, the term "seeded size" may refer to the memory size of the index 330 at the time of its initial creation (e.g., 50 MB). In some implementations, the fill threshold may be adjusted or tuned to modify the performance characteristics of input/output (110) operations in a storage system. For example, the fill threshold may be raised to increase the relative number of writes of journals 320, and to reduce the relative number of writes of indexes 330. In another example, the fill threshold may be lowered to reduce the relative number of writes of journals 320, and to increase the relative number of writes of indexes 330.

Note that, while FIGS. 4A-4C show example processes, other implementations are possible. For example, in some implementations, the process 402 could exclude block 446 (i.e., not modifying the container index to include the detected metadata changes). In such implementations, the process 404 could be modified to include, after determining that the filled amount of the journal is greater than the fill threshold (i.e., at decision block 455) and prior to clearing the journal in the journal group (i.e., at block 460), modifying the container index to include the metadata changes recorded in the journal.

5. Example Process for Generating a Journal Group

Figure 5:
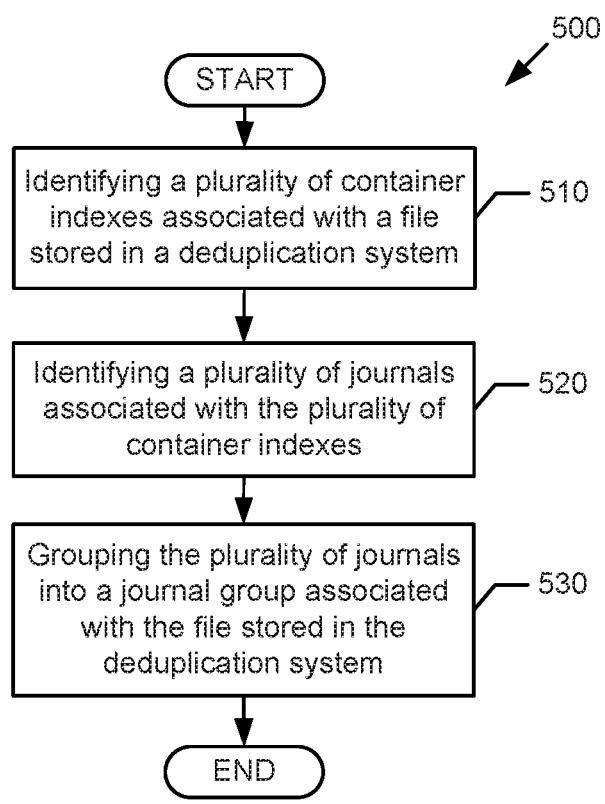
FIG. 5 is an illustration of an example process, in accordance with some implementations.

Referring now to FIG. 5, shown is an example process 500 for generating a journal group, in accordance with some implementations. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-3, which show examples in accordance with some implementations. However, other implementations are also possible.

Block 510 may include identifying a plurality of container indexes associated with a file stored in a deduplication system. Block 520 may include identifying a plurality of journals associated with the plurality of container indexes. Block 530 may include grouping the plurality of journals into a journal group associated with the file stored in the deduplication system. For example, referring to FIGS. 1-3, the storage controller 110 may identify multiple indexes 330 that include metadata for data units included in a single stored object (e.g., a file or table stored in a data container 170 in the persistent storage 140), and may then identify multiple journals 320 that are associated with the identified indexes 330. Further, the storage controller 110 may generate or otherwise define a journal group 310 that includes the multiple identified journals 320. After block 530, the process 500 may be completed.

6. Example Process for Creating New Container Indexes and Journals

Figure 6:
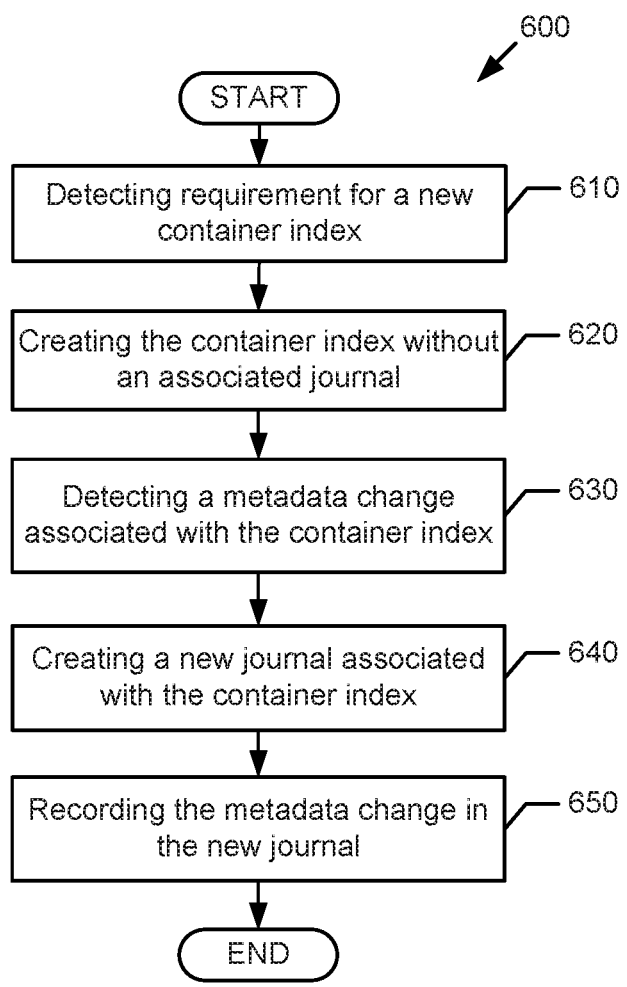
FIG. 6 is an illustration of an example process, in accordance with some implementations.

Referring now to FIG. 6, shown is an example process 600 for creating new container indexes and journals, in accordance with some implementations. In some examples, the process 600 may be performed using the storage controller 110 (shown in FIG. 1). The process 600 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 600 may be described below with reference to FIGS. 1-3, which show examples in accordance with some implementations. However, other implementations are also possible.

Block 610 may include detecting a requirement for a new container index. Block 620 may include creating a container index without an associated journal. For example, referring to FIGS. 1-3, the storage controller 110 may detect a requirement to generate an additional index to store metadata (e.g., upon receiving a new data unit to be stored in a deduplication system). In response to this requirement, the storage controller 110 may create a new index 330 without also creating an associated journal 320. In some examples, the new index 330 may be populated with metadata and/or may be written to the persistent storage 140.

Block 630 may include detecting a metadata change associated with the container index. Block 640 may include creating a new journal associated with the container index. Block 650 may include recording the metadata change in the new journal. For example, referring to FIGS. 1-3, the storage controller 110 may detect a metadata change associated with the index 330, and in response may create a new journal 320 associated with the new index 330. In some examples, the new journal 320 may only be created if the index 330 has previously been populated with metadata and written to the persistent storage 140. The storage controller 110 may then cause the detected metadata change to be recorded in the new journal 320. After block 650, the process 600 may be completed.

Note that, while FIG. 6 shows one example process, other implementations are possible. For example, in some implementations, creating a new journal (i.e., at block 640) and recording the metadata in the new journal (i.e., at block 650) may not be performed if the storage space required to record the metadata change (i.e., detected at block 630) would be larger than the fill threshold of the journal (i.e., discussed above with reference to diamond 455 shown in FIG. 4C). Instead, if the required storage space is larger than the fill threshold, the metadata change may be performed directly in the container index without also performing blocks 640 and 650.

7. Example Process for Compacting a Container Index

Figure 7:
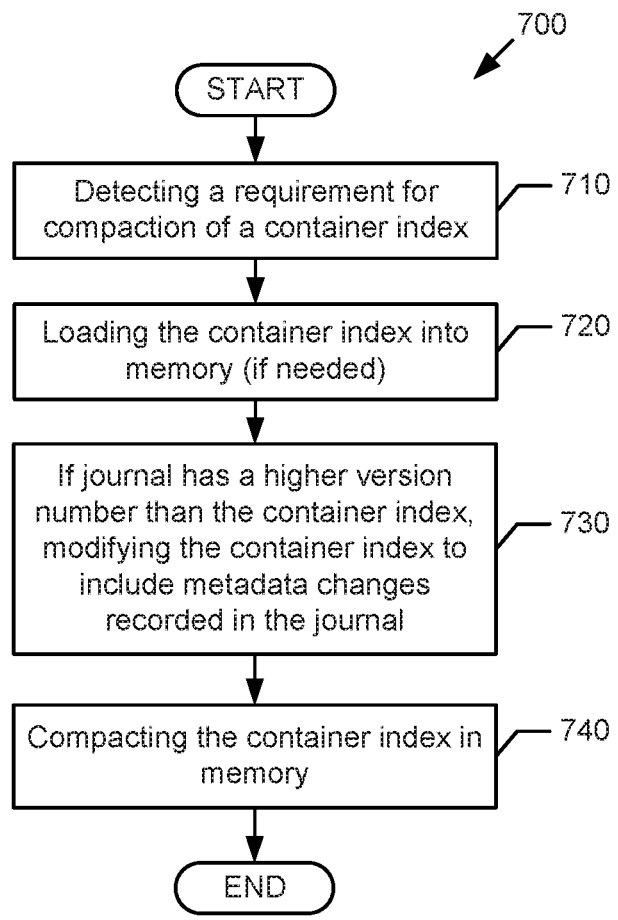
FIG. 7 is an illustration of an example process, in accordance with some implementations.

Referring now to FIG. 7, shown is an example process 700 for compacting a container index, in accordance with some implementations. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 700 may be described below with reference to FIGS. 1-3, which show examples in accordance with some implementations. However, other implementations are also possible.

Block 710 may include detecting a requirement for compaction of a container index. Block 720 may include loading the container index into memory (if not already in memory). Block 730 may include, if an associated journal has a higher version number than the container index, modifying the compacted container index to include the metadata changes recorded in the associated journal. Block 740 may include compacting the container index in memory. For example, referring to FIGS. 1-3, the storage controller 110 may detect an event (e.g., a system condition, a program command, a user command, a timer, an interrupt, and so forth) that causes a compaction of the index 330. In response, the storage controller 110 may load the index 330 into memory 115 (if needed), and may determine whether the version number 325 of the journal 320 is greater than the version number 335 of the index 330. If so, the storage controller 110 may update the index 330 to include the metadata recorded in the journal 320. The storage controller 110 may then perform compaction of the updated index 330. As used herein, "compaction" of an index may refer to removing expired or seldom-used metadata from the index. After block 740, the process 700 may be completed.

8. Example Process

Figure 8:
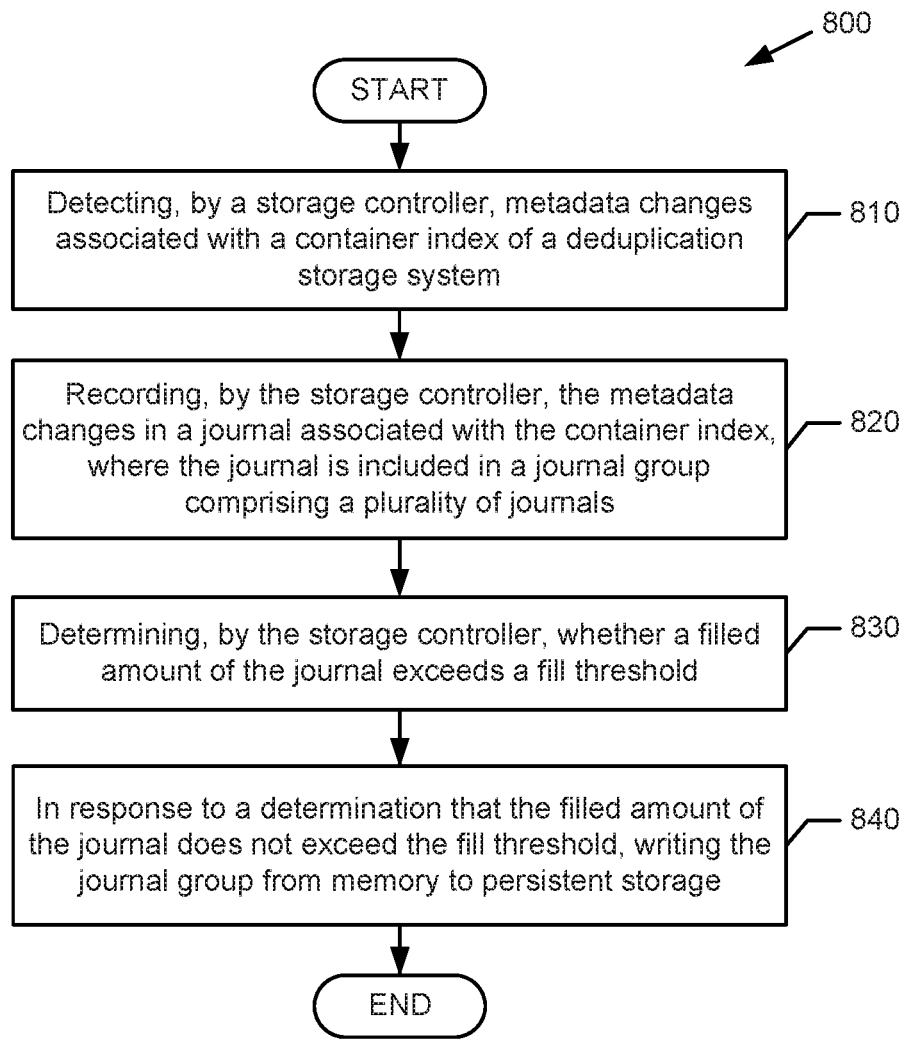
FIG. 8 is an illustration of an example process, in accordance with some implementations.

Referring now to FIG. 8, shown is an example process 800, in accordance with some implementations. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 800 may be described below with reference to FIGS. 1-3, which show examples in accordance with some implementations. However, other implementations are also possible.

Block 810 may include detecting metadata changes associated with a container index of a deduplication storage system. Block 820 may include recording the metadata changes in a journal associated with the container index, where the journal is included in a journal group comprising a plurality of journals. Block 830 may include determining whether a filled amount of the journal exceeds a fill threshold. Block 840 may include, in response to a determination that the filled amount of the journal does not exceed the fill threshold, writing the journal group to persistent storage. For example, referring to FIGS. 1-3, the storage controller 110 may detect changes to the metadata stored in the index 330. For example, such changes may include increases and/or decreases of reference count(s) stored in the index 330 (e.g., in the count field(s) in the data unit record 230 and/or the entity record 240, as shown in FIG. 2). The storage controller 110 may record the detected metadata changes in a journal 320 that is included in a journal group 310. Further, the storage controller 110 may determine that the filled amount of the journal 320 does not exceed a fill threshold, and in response may write the journal group 310 as a whole from memory 115 to the persistent storage 140. After block 840, the process 800 may be completed.

9. Example Machine-Readable Medium

Figure 9:
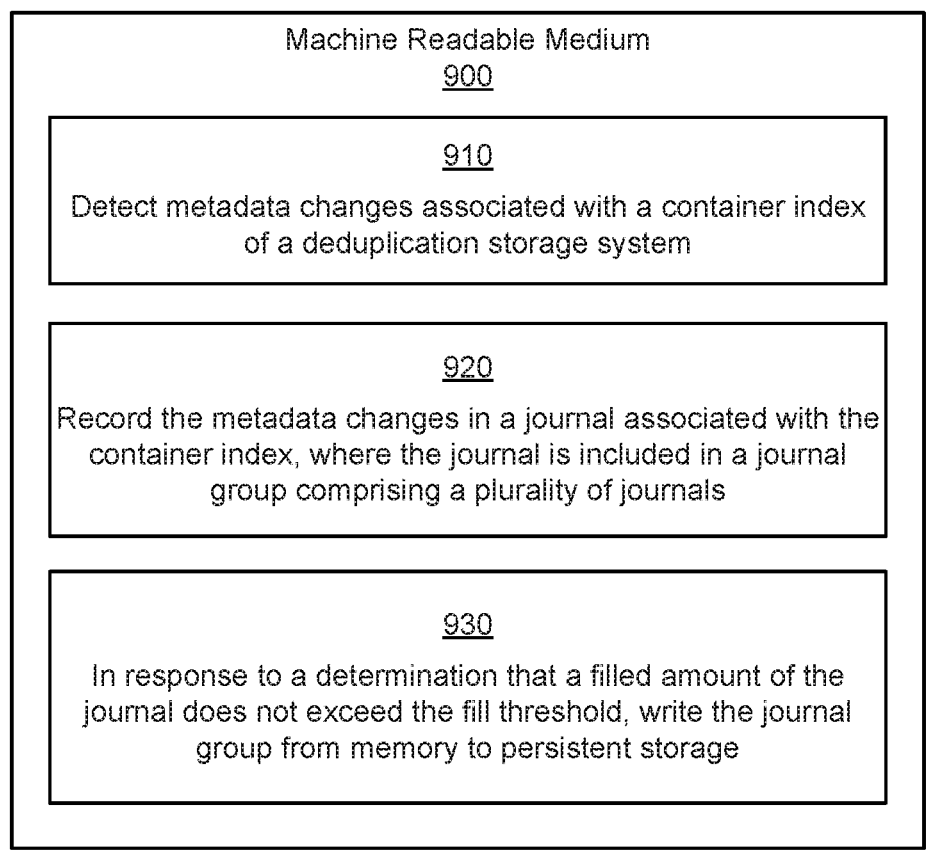
FIG. 9 is a diagram of an example machine-readable medium storing instructions in accordance with some implementations.

FIG. 9 shows a machine-readable medium 900 storing instructions 910-930, in accordance with some implementations. The instructions 910-930 can be executed by a single processor, multiple processors, a single processing engine, multiple processing engines, and so forth. The machine-readable medium 900 may be a non-transitory storage medium, such as an optical, semiconductor, or magnetic storage medium.

Instruction 910 may be executed to detect metadata changes associated with a container index of a deduplication storage system. Instruction 920 may be executed to record the metadata changes in a journal associated with the container index, where the journal is included in a journal group comprising a plurality of journals. Instruction 930 may be executed to, in response to a determination that a filled amount of the journal does not exceed the fill threshold, write the journal group to persistent storage.

10. Example Computing Device

Figure 10:
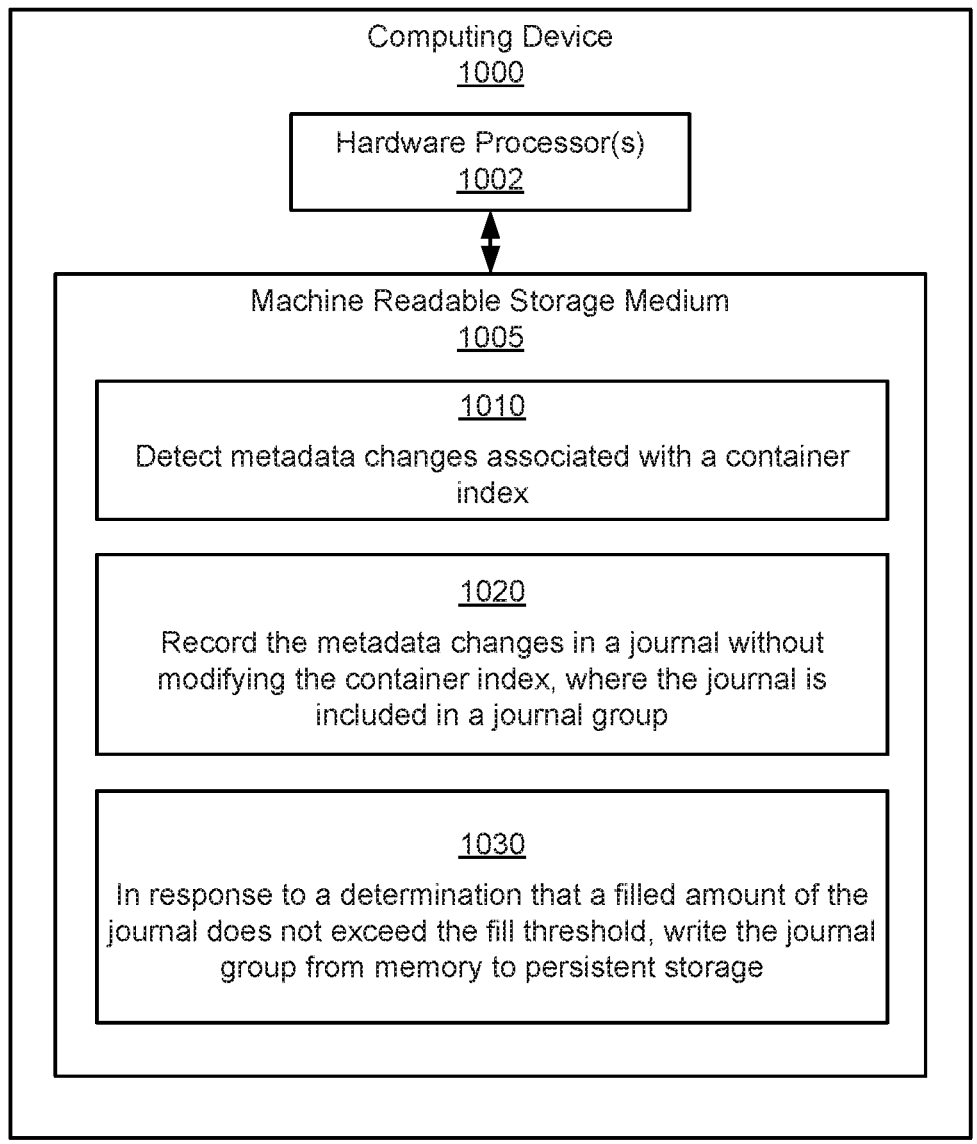
FIG. 10 is a schematic diagram of an example computing device, in accordance with some implementations.

FIG. 10 shows a schematic diagram of an example computing device 1000. In some examples, the computing device 1000 may correspond generally to some or all of the storage system 100 (shown in FIG. 1). As shown, the computing device 1000 may include hardware processor 1002 and machine-readable storage 1005 including instructions 1010-1040. The machine-readable storage 1005 may be a non-transitory medium. The instructions 1010-1040 may be executed by the hardware processor 1002, or by a processing engine included in hardware processor 1002.

Instruction 1010 may be executed to detect metadata changes associated with a container index. Instruction 1020 may be executed to record the metadata changes in a journal without modifying the container index, where the journal is included in a journal group. Instruction 1030 may be executed to replace, in response to a determination that a filled amount of the journal does not exceed the fill threshold, write the journal group to persistent storage.

In accordance with implementations described herein, a deduplication storage system may record metadata changes in a journal associated with an index. If a filled level of the associated journal does not exceed a fill threshold, the journal may be written to persistent storage instead of the index. Accordingly, some implementations may reduce the processing time and/or bandwidth required to write data associated with metadata changes to persistent storage, and may thereby provide improved performance of the deduplication storage system. Further, in some implementations, a journal group including multiple journals may be written to persistent storage as a whole. The journals in a journal group may be associated with a single stored object, and may thus be more likely to be have been modified together within a given time period. Accordingly, using such journal groups may also provide improved performance of the deduplication storage system.

Note that, while FIGS. 1-10 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
  receiving, by a storage controller, a read request for a data unit associated with a container index of a deduplication storage system; and
  in response to receiving the read request:
    loading, by the storage controller, the container index into memory as a whole, and
    loading, by the storage controller, a journal group into the memory as a whole, wherein the journal group includes a first journal associated with the container index;
  detecting, by the storage controller, metadata changes associated with the container index of the deduplication storage system;
  recording, by the storage controller, the detected metadata changes in the first journal associated with the container index, wherein the container index is to be modified to include the metadata changes recorded in the first journal, wherein the journal group is a data structure comprising a plurality of journals, wherein each of the plurality of journals in the journal group records changes associated with a different container index of the deduplication storage system, and wherein each container index comprises metadata indicating storage locations of a plurality of data units;
  determining, by the storage controller, whether a filled amount of the first journal exceeds a fill threshold; and
  in response to a determination that the filled amount of the first journal does not exceed the fill threshold, writing the journal group from the memory to persistent storage.

2. The computer implemented method of claim 1, comprising:
  in response to a determination that the filled amount of the first journal exceeds the fill threshold, writing the container index from the memory to the persistent storage.

3. The computer implemented method of claim 2, comprising:
  prior to writing the container index to the persistent storage:
    clearing the first journal; and
    updating a version number of the container index.

4. The computer implemented method of claim 3, wherein updating the version number of the container index comprises:
  determining a larger number of a current version number of the first journal and a current version number of the container index;
  incrementing the larger number by one; and
  updating the version number of the container index to be equal to the incremented larger number.

5. The computer implemented method of claim 1, comprising:
  prior to writing the first journal to the persistent storage:
    determining a larger number of a current version number of the first journal and a current version number of the container index;
    incrementing the larger number by one; and
    updating a version number of the first journal to be equal to the incremented larger number.

6. The computer implemented method of claim 1, comprising, subsequent to loading the journal group into the memory:
  determining whether a version number of the first journal is greater than a version number of the container index; and
  in response to a determination that the version number of the first journal is greater than the version number of the container index:
    modifying the container index to include the metadata changes previously recorded in the first journal; and
    clearing the first journal to remove the set of metadata changes.

7. The computer implemented method of claim 6, comprising:
  in response to a determination that the version number of the first journal is not greater than the version number of the container index:
    clearing the first journal without modifying the container index.

8. A non-transitory machine-readable medium storing instructions that upon execution cause a processor to:
  in response to receipt of a read request for a data unit associated with a container index of a deduplication storage system:
    load the container index into memory as a whole, and
    load a journal group into the memory as a whole, wherein the journal group includes a first journal associated with the container index;
  detect metadata changes associated with the container index of the deduplication storage system;
  record the metadata changes in the first journal associated with the container index, wherein the container index is to be modified to include the metadata changes recorded in the first journal, wherein the journal group is a data structure comprising a plurality of journals, wherein each of the plurality of journals in the journal group records changes associated with a different container index of the deduplication storage system, and wherein each container index comprises metadata indicating storage locations of a plurality of data units; and in response to a determination that a filled amount of the first journal does not exceed a fill threshold, write the journal group from the memory to persistent storage.

9. The non-transitory machine-readable medium of claim 8, including instructions that upon execution cause the processor to:

in response to a determination that the filled amount of the first journal exceeds the fill threshold, write the container index from the memory to the persistent storage.

10. The non-transitory machine-readable medium of claim 9, including instructions that upon execution cause the processor to, prior to writing the container index to the persistent storage:

clear the first journal;

determine a larger number of a version number of the first journal and a version number of the container index;

increment the larger number by one; and update the version number of the container index to be equal to the incremented larger number.

11. The non-transitory machine-readable medium of claim 8, including instructions that upon execution cause the processor to, prior to writing the first journal to the persistent storage:

determine a larger number of a version number of the first journal and a version number of the container index;

increment the larger number by one; and update the version number of the first journal to be equal to the incremented larger number.

12. The non-transitory machine-readable medium of claim 8, including instructions that upon execution cause the processor to, subsequent to loading the journal group into the memory:

in response to a determination that a version number of the first journal is not greater than a version number of the container index, clear the first journal without modifying the container index; and in response to a determination that the version number of the first journal is greater than the version number of the container index:

modify the container index to include a set of metadata changes previously recorded in the first journal; and clear the first journal.

13. A deduplication storage system comprising:

a processor comprising a plurality of processing engines; and a machine-readable storage storing instructions, the instructions executable by the processor to:

in response to receipt of a read request for a data unit associated with a container index of the deduplication storage system:

load the container index into memory as a whole, and load a journal group into the memory as a whole, wherein the journal group includes a first journal associated with the container index;

detect metadata changes associated with the container index of the deduplication storage system;

record the metadata changes in the first journal without modifying the container index, wherein the container index is to be modified to include the metadata changes recorded in the first journal, wherein the journal group is a data structure comprising a plurality of journals, wherein each of the plurality of journals in the journal group records changes associated with a different container index of the deduplication storage system, and wherein each container index comprises metadata indicating storage locations of a plurality of data units; and in response to a determination that a filled amount of the first journal does not exceed a fill threshold, write the journal group from the memory to persistent storage.

14. The deduplication storage system of claim 13, including instructions executable by the processor to:

in response to a determination that the filled amount of the first journal exceeds the fill threshold, write the container index from the memory to the persistent storage.

15. The deduplication storage system of claim 14, including instructions executable by the processor to, prior to writing the container index to the persistent storage:

clear the first journal;

determine a larger number of a version number of the first journal and a version number of the container index;

increment the larger number by one; and update the version number of the container index to be equal to the incremented larger number.

16. The deduplication storage system of claim 13, including instructions executable by the processor to, prior to writing the first journal to the persistent storage:

determine a larger number of a version number of the first journal and a version number of the container index;

increment the larger number by one; and update the version number of the first journal to be equal to the incremented larger number.

17. The deduplication storage system of claim 13, including instructions executable by the processor to, subsequent to loading the journal group into the memory:

in response to a determination that a version number of the first journal is not greater than a version number of the container index, clear the first journal without modifying the container index; and in response to a determination that the version number of the first journal is greater than the version number of the container index:

modify the container index to include a set of metadata changes previously recorded in the first journal; and clear the first journal.

\* \* \* \* \*